United States Patent [19]

Murakami et al.

[11] Patent Number: 5,321,839
[45] Date of Patent: Jun. 14, 1994

[54] ELECTRONIC EQUIPMENT INCLUDING NON-VOLATILE MEMORY MEANS FOR STORING CONTROL INFORMATION

[75] Inventors: Yutaka Murakami, Yokohama; Kunio Okada, Kawasaki; Yoshiaki Kawamura, Narashino; Haruo Fujita, Yokohama, all of Japan

[73] Assignee: Canon Kabushiki Kaisha, Tokyo, Japan

[21] Appl. No.: 981,989

[22] Filed: Nov. 24, 1992

Related U.S. Application Data

[63] Continuation of Ser. No. 550,440, Jul. 10, 1990, abandoned.

[30] Foreign Application Priority Data

Jul. 13, 1989 [JP] Japan ................................. 1-178966

[51] Int. Cl.$^5$ .......................... G06F 13/10; G06F 9/06
[52] U.S. Cl. .................................... 395/700; 395/425; 364/243; 364/280.2; 364/245.4; 364/DIG. 1
[58] Field of Search ............... 395/425, 400, 575, 700, 395/650; 364/130

[56] References Cited

U.S. PATENT DOCUMENTS

| | | | |
|---|---|---|---|
| 4,528,644 | 7/1985 | Soderberg et al. | 364/900 |
| 4,590,557 | 5/1986 | Lillie | 364/200 |
| 4,626,986 | 12/1986 | Mori | 364/200 |
| 4,739,486 | 4/1988 | Soderberg et al. | 364/464 |
| 4,791,564 | 12/1988 | Takai | 364/200 |
| 4,879,645 | 11/1989 | Tamada et al. | 364/200 |
| 4,937,777 | 6/1990 | Flood et al. | 364/900 |
| 5,024,544 | 6/1991 | Taketani | 400/692 |
| 5,075,841 | 12/1991 | Kaneko | 395/575 |

FOREIGN PATENT DOCUMENTS

| | | | |
|---|---|---|---|
| 0369934 | 5/1990 | European Pat. Off. | G06F 9/445 |
| 59-140530 | 8/1984 | Japan | G06F 1/00 |
| 63-181056 | 7/1988 | Japan | G06F 13/00 |

*Primary Examiner*—Gopal C. Ray
*Attorney, Agent, or Firm*—Fitzpatrick, Cella, Harper & Scinto

[57] ABSTRACT

An electronic equipment includes a memory for storing information necessary for the execution of control programs and identification information which identify the control programs. A first check determines whether the identification information of the control program to be executed is equal to the identification information stored in the memory. A second check determines whether there is a vacant area in the memory when the decision by the first check indicates non-equality, and a control unit stores the information necessary for the control program to be executed in the memory together with the identification information thereof when the second check detects a vacant area.

4 Claims, 4 Drawing Sheets the various embodiments of the invention, and therefore reference is made to the claims which follow the description for determining the scope of the invention.

ELECTRONIC EQUIPMENT INCLUDING NON-VOLATILE MEMORY MEANS FOR STORING CONTROL INFORMATION

This application is a continuation of application Ser. No. 07/550,440 filed Jul. 10, 1990, now abandoned.

BACKGROUND OF THE INVENTION

1. Field of the Invention

The present invention relates to an electronic equipment which is operable by a plurality of control programs even if initial settings required by the respective control programs are different.

2. Related Background Art

In the electronic equipment whose operation is controlled by a microprocessor, it is not rare to provide a non-volatile RAM (NVRAM) or an electrically erasable programmable ROM (EEPROM) instead of a dip switch and retain various initial settings necessary for the initialization upon power-on in the RAM in order to attain quick initialization at the power-on.

Since the stored content of the NVRAM is not destroyed by the power-off, the NVRAM may function as the dip switch and it is cheaper than the dip switch. Further, the stored content may be altered by a panel switch or an instruction from a host computer.

In a printer which is an example of the electronic equipment, data such as a communication protocol, an architecture of equipment control commands, character font of print characters and an architecture of character codes are stored in the NVRAM as the initial settings and they are used for the initial setting at the power-on.

However, in the past, the NVRAM has been used for the initial setting at the power-on in only an electronic equipment in which the microprocessor performs only one or a very limited range of control functions.

Where a control program is loaded in a program cartridge which can be plugged into the electronic equipment so that the electronic equipment may have multi-functions and multi-applications by a plurality of different control programs, the following problems arise in the initial setting of the control programs at the power-on.

The initial values required to be stored in the NVRAM in order to permit rapid initialization at the power on are not always the same for the respective control programs. Rather, it is normal that the control programs differ from each other to some extent. For example, some programs may need totally different information items or the initial values may be different even if the items are the same. Because of a limited capacity of the NVRAM, it is impossible, as the number of control programs increases, to store all initial values for all control programs which may be used, in the NVRAM.

Further, it is more difficult to store the initial values for control programs which will be developed in the future, at the time of the development of the electronic equipment.

SUMMARY OF THE INVENTION

It is an object of the present invention to provide an electronic equipment which is operable by a plurality of control programs and which stores information required by the respective control programs in the equipment for each program and is flexibly compatible to a control program whose required information is not stored.

It is another object of the present invention to provide an electronic equipment which stores necessary information in a vacant area when a control program which does not retain the necessary information in the equipment is to be executed.

It is a further object of the present invention to provide an electronic equipment which overwrites necessary information for a control program upon instruction when the control program which does not retain the necessary information in the equipment is to be executed and there is no vacant area in a memory of the equipment.

It is still another object of the present invention to provide an electronic equipment which can readily cope with modification of necessary initial settings due to future expansion of a function of the control program or a change of specification.

According to one aspect, the present invention which achieves these objectives relates to an electronic equipment comprising memory means for storing information necessary for the execution of control programs together with identification information which identify the control programs, first check means for determining whether the identification information of a control program to be executed is equal to the identification information stored in the memory means, second check means for determining whether there is a vacant area in the memory means or not when the decision by the first check means indicates non-equality, and control means for storing the information necessary for the control program to be executed in the memory means together with the identification information which identifies the control program when the second check means detects the vacant area.

According to another aspect, the present invention relates to an electronic equipment comprising memory means capable of storing a plurality of information necessary for the execution of control programs together with identification information which identify the control programs, first check means for sequentially determining whether the identification information of the control program to be executed is equal to one of the identification information stored in the memory means, second check means for determining whether there is a vacant area in the memory means, and control means for storing the information necessary for the control program to be executed in the vacant area of the memory means together with the identification information which identifies the control program when the decision by the first check means indicates non-equality and the second check means detects the vacant area.

Other objectives and advantages, besides those discussed above, shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DESCRIPTION OF THE PREFERRED EMBODIMENTS

The preferred embodiments of the present invention are now explained in detail with reference to the drawings.

Figure 1:
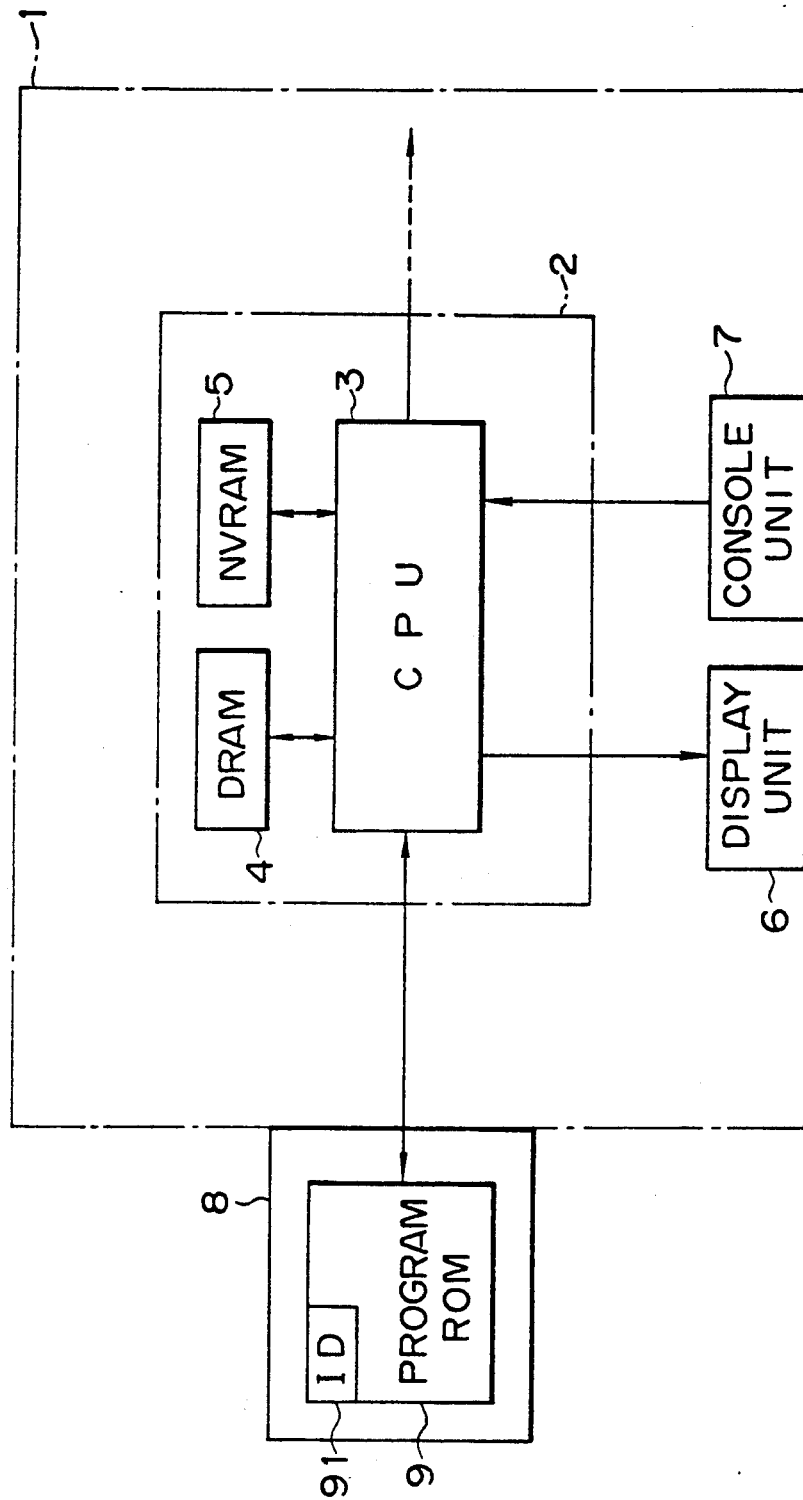
FIG. 1 shows a block diagram of one embodiment of the electronic equipment of the present invention.

FIG. 1 shows one embodiment of the present invention. Numeral 1 denotes an electronic equipment such as a printer. Numeral 2 denotes a control unit mounted on the equipment to control an operation of the equipment. The control unit 2 comprises a central processing unit (CPU) 3, a DRAM 4 used as a work area when the CPU 3 performs a control operation, and a NVRAM 5 for storing initial data necessary for the initialization when the equipment 1 is powered on. Numeral 6 denotes a display unit connected to the CPU 3 for displaying a status of the equipment 1 or indicating an operational instruction to a user of the equipment 1. Numeral 7 denotes a console unit for generating a command signal to the CPU by the manipulation of the user. In the present embodiment, the display unit 6 and the console unit 7 are arranged on the equipment 1 although they may be arranged on a host computer or other monitoring and displaying apparatus electrically connected to the equipment 1.

Numeral 8 denotes a program cartridge to be plugged into the equipment 1 and it contains a program ROM 9 to control the equipment. Numeral 91 denotes an identification code (ID) of the program ROM 9.

Figure 2:
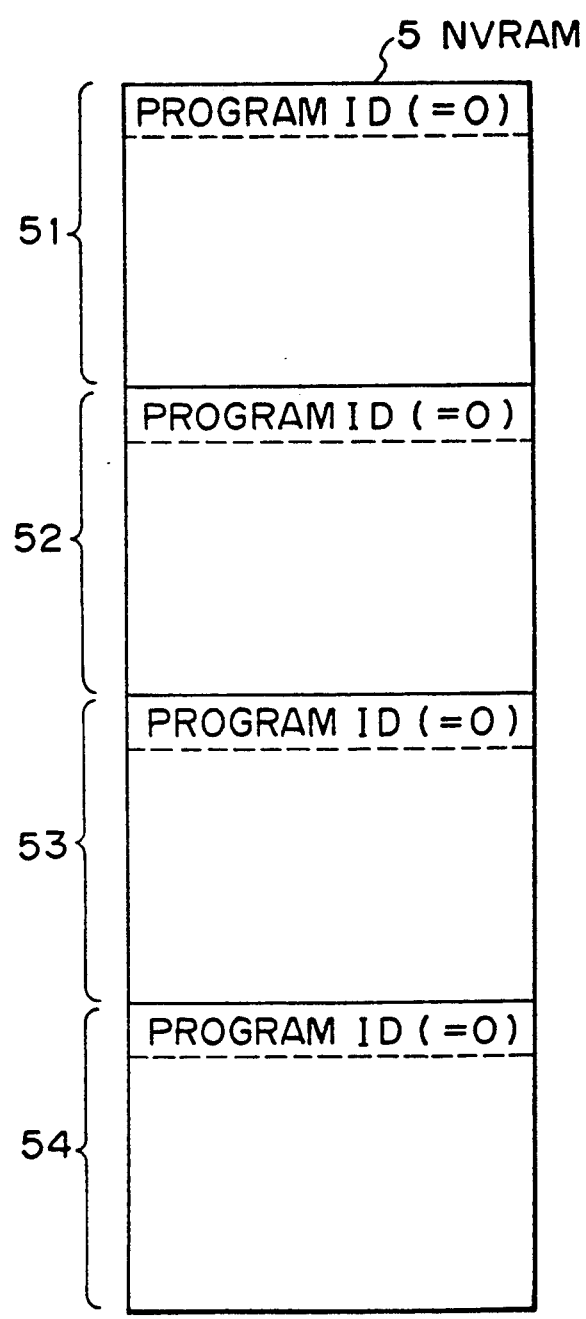
FIG. 2 shows a storage area of a NVRAM in an unused state.

FIG. 2 shows a content of a data storage area of the NVRAM 5 in the control unit 2 at the shipment from a plant, that is, in a unused state. In the present embodiment, the NVRAM 5 has four data storage areas 51, 52, 53 and 54 having different program identification code areas. Thus, different initial data of four program cartridges 8 may be stored in the NVRAM 5. The program ID indicates which information of the program cartridge 8 is stored in the storage area having the program ID. When the program ID is 0 as shown in FIG. 2, it indicates that the storage area is unused.

Figure 3:
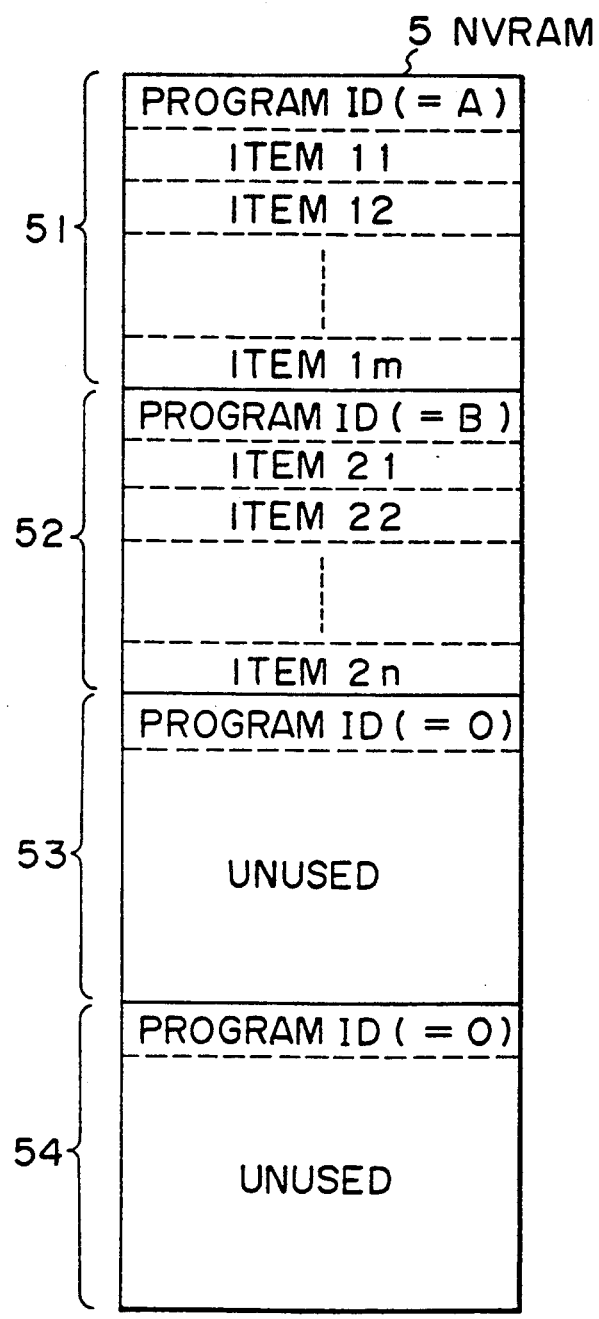
FIG. 3 shows the storage area of the NVRAM in a used state.

FIG. 3 shows that the storage areas 51 and 52 of the four storage areas of the NVRAM 5 shown in FIG. 2 are in a used state. Namely, the storage area 51 which has the program ID "A" contains information items 11 to 1m such as initial data for the control program stored in the program ROM 91 having the program ID 91 "A" contained in the program cartridge 8. Similarly, the storage area 52 having the program ID "B" contains information items 21 to 2n such as initial data for the control program having the program ID 91 "B". The n and m may be equal so that the storage areas for the respective programs are of fixed length, or the n and m may be any values so that the storage areas are of variable length. The program ID's of the storage areas 53 and 54 are "0" indicating that they are unused.

Figure 4:
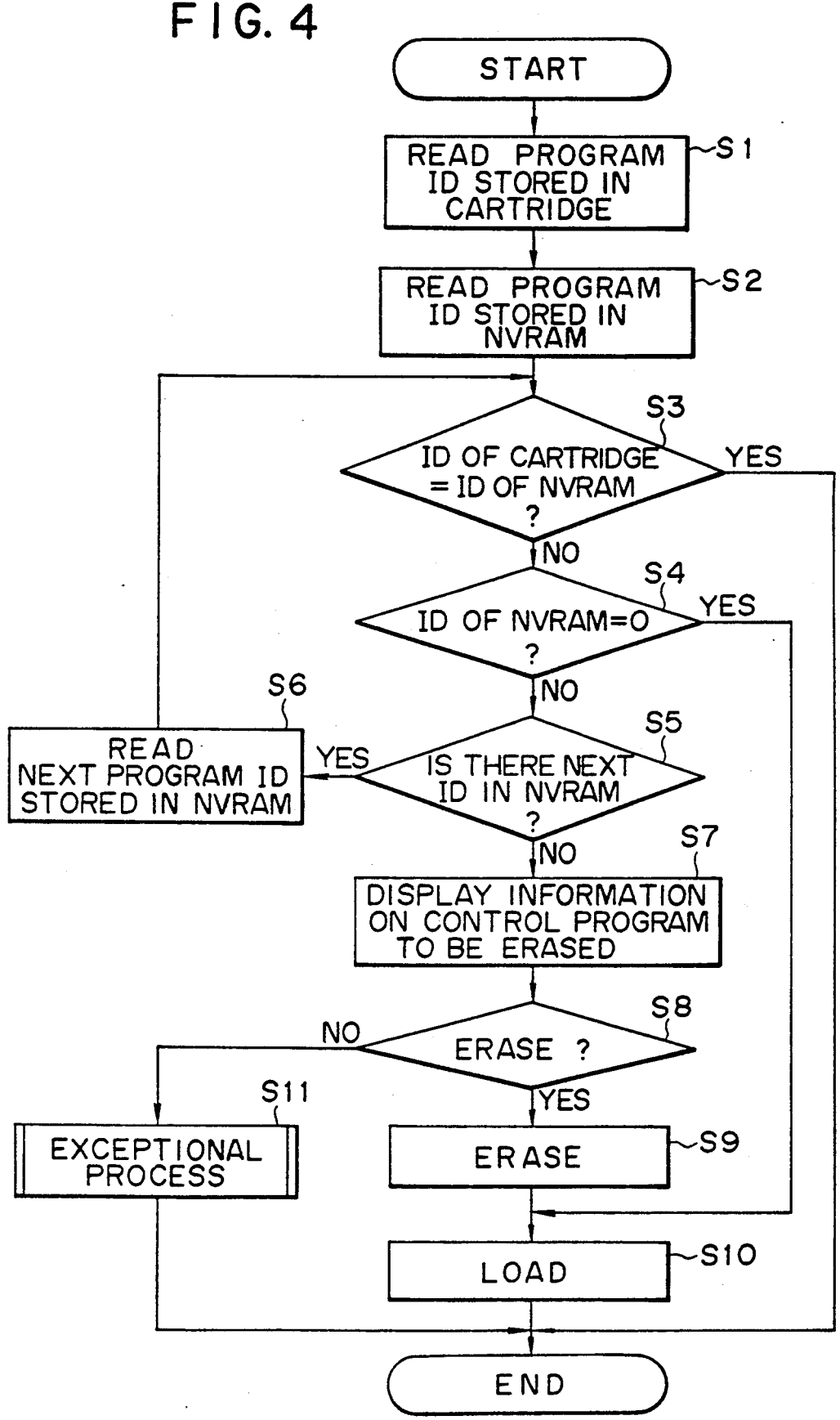
FIG. 4 shows a flow chart of a control sequence at start-up.

FIG. 4 shows an example of an initialization control sequence when the equipment 1 of the present embodiment is powered on. S1 to S11 denote steps in the flow chart.

In the equipment 1 of the present embodiment shown in FIG. 1, when the power is turned on, the CPU 3 reads the program ID 91 of the program ROM 9 in the program cartridge 8 (step S1). Program ID other than "0" is assigned to each of the program cartridges 8 which contain the program ROM's 9 which store the control programs therein.

Then, the program ID of the first storage area 51 of the NVRAM 5 is read (step S2). As described above, the program ID is "0" when the storage area is unused. At the time of shipment of the equipment 1 from a plant, all storage areas are unused.

In a step S3, the program ID of the program cartridge 8 read in the step S1 is compared with the program ID of the storage area of the NVRAM 5 which is currently being read to check the equality thereof. If the decision is affirmative, it means that the initial data necessary for the execution of the control program stored in the program ROM 9 of the program cartridge 8 is already in the NVRAM 5, and the process is terminated and other initialization process is carried out.

If the decision is negative, whether the program ID in the NVRAM 5 is "0" or not is determined (step S4).

If the decision is negative and the program ID of the storage area read from the NVRAM 5 is not "0", it means that the information for another program cartridge is stored, and the process proceeds to a step S5.

In a step S5, whether the program ID of the next storage area is stored in the NVRAM 5 or not is determined. If the decision is affirmative, the process proceeds to a step S6 to read the program ID of the next storage area. Then, the process returns to the step S3 to check whether the program ID in the program cartridge is equal to the program ID of the storage area in the NVRAM 5 newly read or not.

If the decision in the step S4 is affirmative, that is, if the program ID of the storage area read from the NVRAM 5 is "0", it means that there is no storage area corresponding to the control program of the program cartridge 8, in the storage area currently used in the NVRAM 5, and the process proceeds to a step S10. In the step S10, the data for initializing the NVRAM 5 which is stored in the program ROM 9 of the program cartridge 8 is loaded to an unused storage area of the NVRAM 5 which has been determined to have ID="0".

If the decision in the step S5 is negative, that is, if there is no corresponding program ID after searching of the program ID's of all storage areas in the NVRAM 5, the process proceeds to a step S7.

In this case, in order to use the control program of the program cartridge 8, it is necessary to erase information in one of the storage areas in the NVRAM 5 and load the information for the control program in the program cartridge 8 into that storage area. In the step S7, which one of the information for the control programs stored in the NVRAM 5 is to be erased, or an inquiry as to whether the erasure is not to be effected and the use of the program cartridge 8 is to be inhibited is displayed on the display unit 6. The user watches the display and manipulates the console unit 7 to instruct to the inquiry.

In a step S8, the instruction from the console unit 7 is checked. If the decision is negative to the inquiry, that is, if the instruction is not to erase any data stored in the NVRAM 5, a routine exceptional process is carried out and the process is then terminated (step S11).

If the decision in the step S8 is affirmative, the information stored in the storage area instructed in the step S7 is erased (step S9), and the data for the program cartridge 8 is loaded into the erased storage area (step S10).

In the present embodiment, it is assumed that the storage areas of the NVRAM 5 are sequentially used from the top one, and if one unused area is detected, it is assumed that all following areas are unused. Accordingly, if the area having ID="0" is detected in the step S4, no determination is made for the following areas and the information is loaded into this vacant area.

However, where there may be discontinuous used areas because the ID of the area having unnecessary information is rendered "0", the ID equality check in the step S3 may be sequentially carried out, and if all are non-equal, the vacant area check in the step S4 may be sequentially carried out.

If the NVRAM 5 has the area for only one ID, the decision in the step S5 and the process in the step S6 are not carried out, and whether the overwriting is to be carried out or not is instructed in the step S7.

In the present embodiment, the control programs used are all stored in the program ROM 9 in the program cartridge 8. Where a ROM is provided in the control unit 2 of the equipment 1 to store a portion of the control program and the program cartridge 8 is not loaded to the equipment 1, or where the control program stored in the program cartridge 8 is not to be executed, the equipment 1 may be controlled by only the control program stored in the control unit 8. In such a case, the control program stored in the control unit 2 may use the storage area of the NVRAM 5.

In the present embodiment, each control program uses one storage area on the NVRAM 5. However, depending on the control program, a plurality of storage areas may be used or the storage area may be shared by other control programs.

In the electronic equipment of the present invention, the externally read information necessary for the control program is stored in the equipment together with the identification information which identify the control program in order to attain rapid processing, and when it is determined that there is no necessary information in the equipment after the checking of the identification information, the information is externally read and stored into the vacant area of the memory in the equipment. If there is no vacant area, it is informed to the user to request the instruction, and upon instruction, the information is overwritten on one of the currently used information areas.

In this manner, a flexible operation is attained for the execution of the control program whose necessary initial data is not previously stored in the equipment.

What is claimed is:

1. An electronic equipment comprising:
   non-volatile memory means capable of storing a plurality of initial data for the execution of a plurality of control programs respectively, together with identification information for identifying the control programs;
   read-out means, connected to said non-volatile memory means and detachably connected to an external memory means for storing a control program and identification information thereof, for reading out identification information from said non-volatile memory means and for reading out identification information of the control program to be executed from the external memory means;
   first check means, connected to said read-out means, for sequentially determining whether the identification information read out from the external memory means by said read-out means is equal to one of the identification information of the control programs read out from said non-volatile memory means by said read-out means;
   second check means, connected to said non-volatile memory means and said first check means, for determining whether there is a vacant area in said non-volatile memory means when the decision by said first check means indicates an inequality; and
   control means, connected to said non-volatile memory means and said second check means, for causing said non-volatile memory means to store the initial data for the control program to be executed with the identification information in the vacant area when the decision by said second check means indicates that there is a vacant area, said control means causing the non-volatile memory means to abstain from altering the contents thereof when said first check means indicates an equality.

2. An electronic equipment according to claim 1, further comprising:
   inquiry means, connected to said second check means and said read-out means, for displaying a plurality of second identification information corresponding to the identification information read out from said non-volatile memory means by said read-out means respectively, and displaying an inquiry to a user regarding which one of the initial data, stored in said non-volatile memory means, corresponding to the second identification information to be overwritten by the initial data for the control program to be executed when said second check means detects no vacant area;
   designating means, connected to said inquiry means, for designating one of the second identification information displayed by said inquiry means; and
   second control means, connected to said designating means, said readout means and said non-volatile memory means, for overwriting the initial data for the control program to be executed and the identification information thereof, read out from said external memory means by said read-out means, over the initial data and the identification information thereof, corresponding to the second identification information designated by said designating means, in said non-volatile memory means.

3. A method of controlling an electronic equipment comprising the steps of:
   reading out identification information of a control program to be executed from an external memory storing the control program and the identification information thereof, said external memory detachably connected to the electronic equipment;
   reading out identification information of control programs sequentially from a non-volatile memory, said non-volatile memory capable of storing a plurality of initial data for the execution of a plurality of control programs respectively, together with the identification information for identifying the control programs;
   sequentially determining whether the identification information read out from the external memory is equal to one of the identification information of the control programs read out from the non-volatile memory;
   determining whether there is a vacant area in the non-volatile memory when none of the identification information read out from the non-volatile memory is determined to be equal to the identification information read out from the external memory;

causing said non-volatile memory to store the initial data for the control program to be executed and the identification information thereof in the vacant area when it is determined that there is a vacant area in the non-volatile memory; and causing the non-volatile memory to abstain from altering the contents thereof when the identification information read out from the external memory is determined to be equal to any one of the identification information read out from the non-volatile memory.

4. A method according to claim 3, further comprising the steps of:

displaying a plurality of second identification information corresponding to the identification information read out from the non-volatile memory;

displaying an inquiry to a user regarding which one of the initial data, stored in said non-volatile memory, corresponding to the second identification information to be overwritten by the initial data for the control program to be executed when it is determined that there is not any vacant area in the non-volatile memory;

designating one of the displayed second identification information; and overwriting the initial data for the control program to be executed and the identification information thereof, read out from the external memory, over the initial data and the identification information thereof, corresponding to the designated second identification information, in the non-volatile memory.

* * * * *